United States Patent
Park et al.

(10) Patent No.: US 10,447,754 B2
(45) Date of Patent: *Oct. 15, 2019

(54) METHOD AND APPARATUS FOR TRANSMITTING/RECEIVING MEDIA CONTENTS IN MULTIMEDIA SYSTEM

(71) Applicant: Samsung Electronics Co., Ltd., Suwon-si, Gyeonggi-do (KR)

(72) Inventors: Kyung-Mo Park, Seoul (KR); Sung-Ryeul Rhyu, Yongin-si (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,904

(22) Filed: Oct. 22, 2018

(65) Prior Publication Data

US 2019/0058748 A1 Feb. 21, 2019

Related U.S. Application Data

(63) Continuation of application No. 13/495,429, filed on Jun. 13, 2012, now Pat. No. 10,110,655.

(30) Foreign Application Priority Data

Jun. 14, 2011 (KR) .................. 10-2011-0057714
Oct. 13, 2011 (KR) .................. 10-2011-0104862
Nov. 28, 2011 (KR) .................. 10-2011-0125458

(51) Int. Cl.
*H04L 29/06* (2006.01)

(52) U.S. Cl.
CPC ........ *H04L 65/607* (2013.01); *H04L 65/4023* (2013.01)

(58) Field of Classification Search
None
See application file for complete search history.

(56) References Cited

U.S. PATENT DOCUMENTS 5,497,371 A 3/1996 Ellis et al.
5,557,677 A 9/1996 Prytz
(Continued)

FOREIGN PATENT DOCUMENTS

CN 1744485 A 3/2006
CN 101006663 A 7/2007
(Continued)

OTHER PUBLICATIONS

European Examination Report dated Jun. 5, 2019, issued in a counterpart European application No. 12799847.4-1213.
(Continued)

*Primary Examiner* — Gregory B Sefcheck
(74) *Attorney, Agent, or Firm* — Jefferson IP Law, LLP (57) ABSTRACT

A method and an apparatus of transmitting media content in a multimedia system are provided. The method includes determining a transmission unit for transmitting at least one multimedia source related to the media content, generating a data stream including header information and the at least one multimedia source according to the determined transmission unit, and transmitting the data stream through a communication network.

5 Claims, 6 Drawing Sheets

(56) References Cited

U.S. PATENT DOCUMENTS

| | | | |
|---|---|---|---|
| 5,812,545 A | 9/1998 | Liebowitz et al. | |
| 5,831,662 A | 11/1998 | Payton | |
| 6,646,983 B1 | 11/2003 | Roy et al. | |
| 6,876,670 B1 | 4/2005 | Budrikis et al. | |
| 6,891,832 B1 | 5/2005 | Chien | |
| 7,127,496 B2 | 10/2006 | Isozu et al. | |
| 7,161,909 B2 | 1/2007 | Sharma | |
| 7,230,918 B1 | 6/2007 | Maiya et al. | |
| 7,266,087 B2 | 9/2007 | Wahl | |
| 7,336,283 B2 | 2/2008 | McCormack et al. | |
| 7,433,314 B2 | 10/2008 | Sharma et al. | |
| 7,613,106 B2* | 11/2009 | Baldwin | H04L 29/06027 370/217 |
| 7,614,068 B2 | 11/2009 | Jansky | |
| 7,653,393 B2 | 1/2010 | Kim et al. | |
| 7,684,430 B2 | 3/2010 | Gaur et al. | |
| 7,742,415 B1 | 6/2010 | Dave | |
| 7,747,444 B2 | 6/2010 | McIntyre et al. | |
| 7,747,558 B2 | 6/2010 | Smith et al. | |
| 7,756,055 B2 | 7/2010 | Hulbert | |
| 7,804,835 B2 | 9/2010 | Koppelaar et al. | |
| 7,848,237 B2 | 12/2010 | Todd et al. | |
| 7,870,377 B2 | 1/2011 | Jansky | |
| 7,894,481 B2 | 2/2011 | Van Greunen et al. | |
| 7,903,574 B2 | 3/2011 | Vare et al. | |
| 7,912,057 B2 | 3/2011 | Petry et al. | |
| 7,948,911 B2 | 5/2011 | Larsson | |
| 7,970,014 B2 | 6/2011 | Voith et al. | |
| 7,978,669 B2 | 7/2011 | Kumar et al. | |
| 8,055,284 B2* | 11/2011 | Jeon | H04H 60/25 455/450 |
| 8,122,479 B2 | 2/2012 | Britt | |
| 8,159,955 B2 | 4/2012 | Larsson | |
| 8,176,252 B1 | 5/2012 | Alexander et al. | |
| 8,225,164 B2* | 7/2012 | Westerlund | H04L 67/06 714/752 |
| 8,301,957 B2 | 10/2012 | Martret et al. | |
| 8,316,132 B2* | 11/2012 | Pohjolainen | H04N 21/235 709/227 |
| 8,346,945 B2* | 1/2013 | Bouazizi | H04N 21/4305 709/228 |
| 8,363,672 B2 | 1/2013 | Ben-Haim et al. | |
| 8,392,748 B2* | 3/2013 | Bocharov | H04N 21/23116 709/217 |
| 8,396,082 B2* | 3/2013 | Hannuksela | H04L 1/0057 370/473 |
| 8,498,220 B2 | 7/2013 | Vare et al. | |
| 8,675,657 B2 | 3/2014 | Shiotani | |
| 8,717,961 B2* | 5/2014 | Ryu | H04H 20/72 370/312 |
| 8,831,039 B2* | 9/2014 | Hannuksela | H04L 1/0057 370/473 |
| 8,856,416 B2 | 10/2014 | Minnick et al. | |
| 8,929,444 B2 | 1/2015 | Villion et al. | |
| 8,937,923 B2* | 1/2015 | Xu | H04W 36/02 370/331 |
| 9,071,667 B2 | 6/2015 | Swaminathan et al. | |
| 9,667,682 B2 | 5/2017 | Swaminathan et al. | |
| 2002/0129383 A1 | 9/2002 | Wasilewski | |
| 2002/0131425 A1 | 9/2002 | Shalom | |
| 2002/0150100 A1 | 10/2002 | White et al. | |
| 2004/0008770 A1 | 1/2004 | Okada et al. | |
| 2005/0123042 A1 | 6/2005 | Park | |
| 2005/0238054 A1 | 10/2005 | Sharma | |
| 2005/0268324 A1 | 12/2005 | An | |
| 2006/0168133 A1 | 7/2006 | Park et al. | |
| 2006/0184790 A1 | 8/2006 | Oliveira et al. | |
| 2006/0212902 A1 | 9/2006 | Seo et al. | |
| 2007/0086481 A1 | 4/2007 | Klemets | |
| 2007/0110390 A1 | 5/2007 | Toma | |
| 2008/0056297 A1 | 3/2008 | Gaur et al. | |
| 2008/0225838 A1 | 9/2008 | Vesma et al. | |
| 2008/0225892 A1 | 9/2008 | Vare et al. | |
| 2009/0028142 A1 | 1/2009 | Schmidt et al. | |
| 2009/0135849 A1 | 5/2009 | Alkove et al. | |
| 2009/0175353 A1 | 7/2009 | Suh et al. | |
| 2009/0285238 A1 | 11/2009 | Shiraishi | |
| 2010/0142557 A1 | 6/2010 | Priddle et al. | |
| 2010/0296584 A1 | 11/2010 | Base et al. | |
| 2011/0019747 A1 | 1/2011 | Hannuksela et al. | |
| 2011/0090960 A1 | 4/2011 | Leontaris et al. | |

FOREIGN PATENT DOCUMENTS

| | | |
|---|---|---|
| CN | 101146212 A | 3/2008 |
| CN | 101272383 A | 9/2008 |
| CN | 101453463 A | 6/2009 |
| CN | 101785278 A | 7/2010 |
| CN | 102067610 A | 5/2011 |
| EP | 1 694 031 A1 | 8/2006 |
| EP | 2 148 491 A2 | 1/2010 |
| JP | 11-98503 A | 4/1999 |
| JP | 2001-78181 A | 3/2001 |
| JP | 2004-23303 A | 1/2004 |
| JP | 2005-176352 A | 6/2005 |
| JP | 2006-505024 A | 2/2006 |
| JP | 2006-166453 A | 6/2006 |
| JP | 2007-522749 A | 8/2007 |
| JP | 2008-67350 A | 3/2008 |
| JP | 2009-505516 A | 2/2009 |
| JP | 2010-136441 A | 6/2010 |
| JP | 2017-80313 A | 5/2017 |
| KR | 10-2007-0033322 A | 3/2007 |
| KR | 10-0937045 B1 | 1/2010 |
| KR | 10-2010-0033447 A | 3/2010 |
| RU | 2009 119 437 A | 11/2010 |
| WO | 2005/120060 A1 | 12/2005 |
| WO | 2011/038013 A2 | 3/2011 |

OTHER PUBLICATIONS

Electronics and Telecommunications Research Institute (ETRI); Layering of MMT Headers for Packet Delivery, P030048962; Jun. 13, 2011, Torino, Italy.

Samsung Electronics; Contribution to MMT EE#1 (E.3 Layer Design),XP030050085; Oct. 23, 2011, Geneva, Switzerland.

Battista, S. et al., MPEG-4: A Multimedia Standard for the Third Millennium, Part 1, MultiMedia, IEEE, Oct.-Dec. 1999, vol. 6, Issue 4, pp. 74-83.

Kyungmo Park et al., Working Draft 2.0 of MPEG Media Transport, ISO/IEC JTC1/SC29/WG11/N11953, Apr. 22, 2011, p. 1-12.

Jaeyeon Song et al., Response to Call for Proposals for MPEG Media Transport, ISO/IEC JTC1/SC29/WG11 MPEG2011/M19266, Jan. 20, 2011, p. 1-43, Daegu, Korea.

* cited by examiner

METHOD AND APPARATUS FOR TRANSMITTING/RECEIVING MEDIA CONTENTS IN MULTIMEDIA SYSTEM

PRIORITY

This application is a continuation application of prior application Ser. No. 13/495,429, filed on Jun. 13, 2012, which has issued as U.S. Pat. No. 10,110,655 on Oct. 23, 2018 and was based on and claimed priority under 35 U.S.C. § 119(a) of a Korean patent application number 10-2011-0057714, filed on Jun. 14, 2011, in the Korean Intellectual Property Office, a Korean patent application number 10-2011-0104862, filed on Oct. 13, 2011, and a Korean patent application number 10-2011-0125458, filed on Nov. 28, 2011 in the Korean Intellectual Property Office the disclosure of which is incorporated by reference herein in its entirety.

BACKGROUND OF THE INVENTION

1. Field of the Invention

The present invention relates to a method and an apparatus for transmitting and/or receiving media contents in a multimedia system. More particularly, the present invention relates to a method and an apparatus for transmitting and/or receiving media contents by using various transmission units.

2. Description of the Related Art

Due to an increase of multimedia contents available through the Internet and communications networks, as well as recent developments of technology, hybrid media contents, including various types of multimedia contents, are released for viewing, listening, using, and consuming, at a time in which a single or two or more multimedia sources have been used. The hybrid media contents may include various types of multimedia contents. The hybrid media contents are generated by separating the hybrid media contents into individual multimedia contents.

For example, the hybrid media contents may be implemented with an application, such as a widget for constructing an image that is a hybrid media content including video data, image data, voice data, and a specific motion image, and which are generated through an image signal encoding method, a voice signal encoding method, a file compression method, or other similar data generation methods, in accordance with a characteristic of each media, and the respective multimedia contents are reconstructed as the hybrid media contents at a reception side.

As described above, the conventional hybrid media contents are separated into a plurality of multimedia contents at a transmission side and provided to the reception side in the separated form. The reception side generates the hybrid media contents by reconstructing the plurality of separated multimedia contents. The use of the hybrid media contents is provided through the separation into and the reconstruction of the plurality of the separated multimedia contents. However, due to an increase of the use of hybrid media contents, a method of more efficiently generating and transmitting and/or receiving the hybrid media contents is needed.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for efficiently transmitting and/or receiving a media content by using various transmission units.

Another aspect of the present invention is to provide a method and an apparatus for transmitting and/or receiving a hybrid media content, including various multimedia data, by using a transmission unit appropriate to corresponding multimedia data.

In accordance with an aspect of the present invention, a method of transmitting a media content in a multimedia system is provided. The method includes determining a transmission unit for transmitting at least one multimedia source related to the media content, generating a data stream including header information and the at least one multimedia source according to the determined transmission unit, and transmitting the generated data stream through a communication network.

In accordance with another aspect of the present invention, an apparatus for transmitting a media content in a multimedia system is provided. The apparatus includes a transmission unit for transmitting a data stream through a communication network, and a controller for determining a transmission unit for transmitting at least one multimedia source related to the media content, for generating a data stream including header information and the at least one multimedia source according to the determined transmission unit, and for controlling transmission of the generated data stream.

In accordance with another aspect of the present invention, a method of receiving a media content in a multimedia system is provided. The method includes receiving a data stream of the media content through a communication network, and determining a transmission unit of the media content, identifying header information according to the determined transmission unit, and decoding the media content including at least one multimedia source according to the identified header information.

In accordance with another aspect of the present invention, an apparatus for receiving a media content in a multimedia system is provided. The method includes a receiving unit for receiving a data stream of the media content through a communication network, and a controller for determining a transmission unit of the media content, for identifying header information according to the determined transmission unit, and for decoding the media content including at least one multimedia source according to the identified header information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the exemplary embodiments of the present invention will be described based on Motion Picture Experts Group (MPEG) Media Transport (MMT) technology among technologies to which the exemplary embodiments of the present invention may be applied. However, the present invention is not limited thereto, and the exemplary embodiments of the present invention may be applied to any suitable or similar technology or communications standard.

Figure 1:
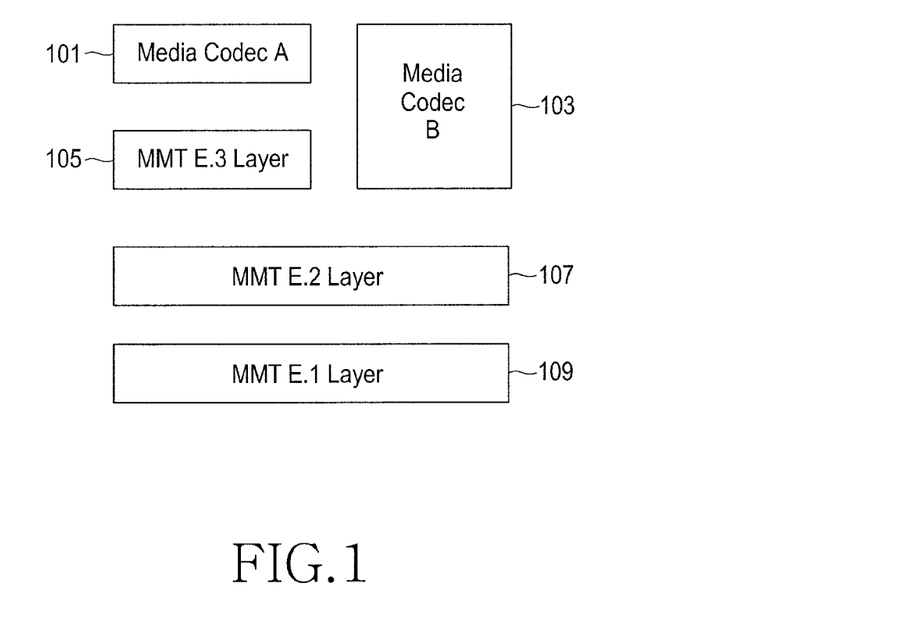
FIG. 1 is a diagram illustrating a layer structure for processing hybrid media contents in an Motion Picture Experts Group (MPEG) Media Transport (MMT) according to an exemplary embodiment of the present invention.

FIG. 1 is a diagram illustrating a layer structure for processing hybrid media contents in the MMT according to an exemplary embodiment of the present invention.

Referring to FIG. 1, a structure of an E layer is shown, and the E layer includes a MMT E.3 layer 105, MMT E.2 layer 107, and MMT E.1 layer 109.

Media Codec A 101 and media code B 103 are media codec layers for decoding and/or encoding multimedia data. The media codec A 101 and the media codec B 103 may have different functions. For example, a Network Adaptation Layer (NAL) unit for providing characteristic information, signaling information for decoding, and other similar information on multimedia data, together with the multimedia data, including compressed digital video, as control information, is an output of an encoder in a H.264 codec (not shown), and multimedia data, such as compressed digital video, is an output of an encoder in the H.262 codec (not shown). H.264 encoding may be performed in the media codec B 103, and an H.262 encoding may be performed in the media codec A 101. However the present invention is not limited thereto, and the H.264 encoding may be performed in the media codec A 101.

That is, the media codec C 103 is able to perform the encoding of the multimedia data to which control information, such as characteristic information and signaling information, is added, and the media codec A 101 is able to perform the encoding of only the multimedia data.

Referring to FIG. 1, the MMT E.3 layer 105 adds control information, such as characteristic information and signaling information required for the decoding, corresponding to multimedia data to the encoded multimedia data transferred from the media codec A 101 and transfers the multimedia data to the MMT E.2 layer 107. In such a case, information on the MMT E.3 layer 105 contains an NAL unit header and NAL unit data, and additionally includes additional header information.

Figure 6:
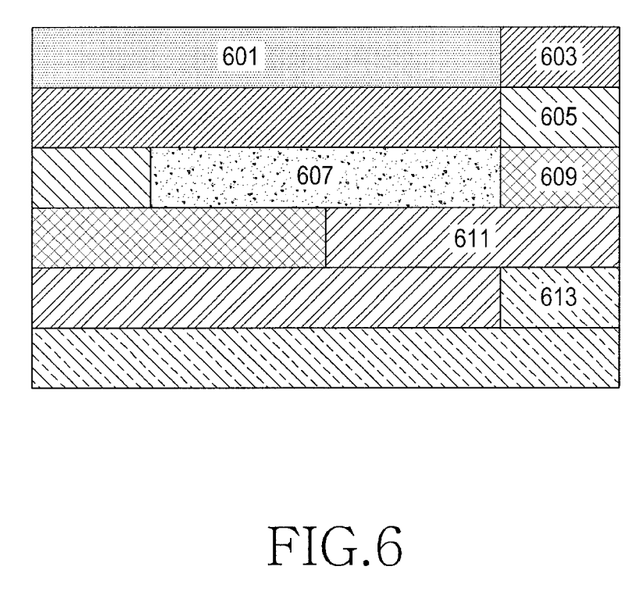
FIG. 6 is a diagram illustrating a video frame configured with a plurality of slices according to an exemplary embodiment of the present invention.

FIG. 6 illustrates a video frame configured with a plurality of video slices according to an exemplary embodiment of the present invention.

Referring to FIG. 6, a structure of the video frame is for one frame displayed as a single image of a video at a specific time and includes a plurality of slices 601 to 613. In further detail, the single image of the video is encoded into seven small blocks, which are the slices 601, 603, 605, 607, 609, 611, and 613.

That is, the plurality of slices 601 through 613 are included in the frame displayed in the single image of the video. The plurality of slices 601 through 613 may be arranged sequentially from a left side towards a right direction, as illustrated in FIG. 6, and may be arranged from a top side towards a lower direction while filling the frame, or may be arranged in any other suitable manner. For example, a plurality of slices included in the single frame may fill the frame with various combinations in a direction from a left or right side towards a right or left side or a direction from a lower or upper side towards an upper or lower side. The plurality of slices 601 through 613 may have different lengths.

The frame having the structure of FIG. 6 may be configured as a Media Unit (M-Unit) which is one of transmission units of the hybrid media contents, including at least one piece of information, such as control information, among time information, an importance degree, and various function information, such as a random access point to be described. Additionally, each of the slices 601 through 613 included in the frame is independently decodable and may be configured as a Media Fragment Unit (MFU).

Furthermore, the M-Unit may be defined as an independently operating unit, such as a largest group frame, or in other words, a Group of Pictures (GoP), in which data has subordinate data units to be recorded. According to the present exemplary embodiment, when the MFU corresponds to one slice within the frame, the one frame is configured as one M-Unit. Furthermore, when the MFU corresponds to one frame, the M-Unit is configured as the GoP that is an independent decoding unit.

In consideration of a next-generation multimedia broadcasting system, a video frame may include the MFU that is a minimum decoding unit and the M-Unit that is the decoding unit including the control information. Furthermore, the M-Unit may include a single MFU, fragmented MFUs, or a group of MFUs. The decoder may control a control function for each minimum construction unit based on the control information. Also, the MFU is a minimum data unit input to the MMT E.3 layer 105 (see FIG. 1), and the M-Unit is an output data unit of the MMT E.3 layer 105 including the control information, such as the time information. Accordingly, the present exemplary embodiment allows for configuration of efficient media contents data for transmission and storage in a next-generation multimedia broadcasting system by using the structuralized MFU or M-Unit.

The MFU according to the present exemplary embodiment is a minimum configuration unit for configuring the media contents data and includes construction information on the media contents data. The configuration information includes at least one of an identifier indicating a start point, a center point, and an end point of the respective media contents data, and indicating non-partition of data, setting information for setting a media codec, type information indicating a type of data representing information on a format of encoded media, priority information on the media contents data, point information indicating a start point of the media contents data, size information on the media content data, and information indicating specific information on the layered encoding and a multi-view media codec. A unit size of the MFU may indicate a size of an independently encodable and/or decodable unit. For example, a video may be fragmented into a picture, a slice, and an access unit, based on a data unit from a macro block that is a minimum encoding and/or decoding unit of a media codec.

Figure 8:
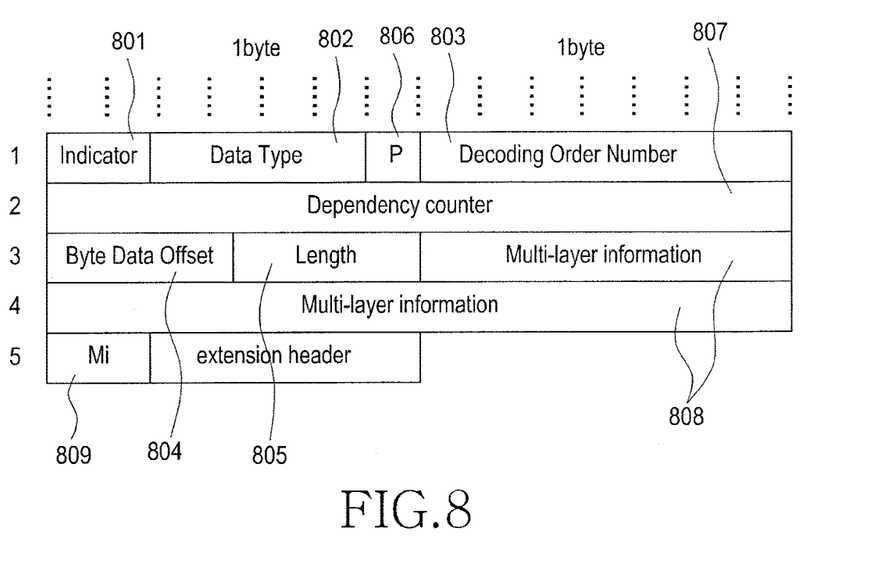
FIG. 8 is a diagram illustrating a construction of a Media Fragment Unit (MFU) according to an exemplary embodiment of the present invention.

FIG. 8 is a diagram illustrating a construction of an MFU according to an exemplary embodiment of the present invention.

Referring to FIG. 8, the present invention is not limited to the exemplary embodiment of FIG. 8 and the illustrated construction of the MFU, and the MFU may be configured in a variety of suitable constructions and types.

The additional header information as the configuration information on the MFU that is unit information included in the output data unit of the media encoding includes at least one of the information fields 801 to 809 in relation to the MFU. The information fields 801 to 809 are described in further detail below.

As indicator 801 of the MFU includes the configuration information on the MFU and indicates flag information indicating whether MFU data is fragmented and also indicates a start unit, a continued unit, or a last unit among the MFUs. A data type 802 indicates a type of MFU data and is information indicating an attribute of corresponding MFU data. For example, the data type 802 may indicate the type of data for setting information on a media codec, motion prediction information of the encoding, encoded data, configuration information on encoded data, and other similar data.

A decoding order number 803 is used to indicate when flag information on the fragmented MFU is continued. The MFU has an increasing number that is order information indicating an order of the use of a corresponding MFU. Furthermore, a client terminal may utilize the increasing number that is the order information indicating the order of the use of the corresponding MFU as information on a decoding order. Byte data offset 804 indicates an actual position that is a start of media data. Length 805 is information indicating a length of media data.

Priority (P) 806 is information that indicates a value of a priority of the MFU. For example, when the priority 806 is "0", it indicates that the corresponding MFU does not have priority data, and when the priority 806 is "1", the corresponding MFU has priority data. In a case of an NAL header parameter for media, the priority 806 may be set as "1". The priority 806 indicates that data fragmented within a single media unit is priority data, such that when the priority information is lost, the decoding may be interrupted.

Dependency counter 807 indicates a value of a dependent MFU count within an independently encodable and/or decodable unit. For example, when a value of the dependency count is "4", it means that four following MFUs are dependent on corresponding MFU data. For example, when there are four correlated MFUs of the MFU having a dependency count of "4", the first MFU has a count value of "3", the second MFU has a count value of "2", the third MFU has a count value of "1", and the last MFU has a count value of "0". Through the use of the dependency count, a degree of propagating an error may be indicated when the corresponding MFU data has the error.

Multi-layer information 808 indicates an identifier of basic media, an identifier of enhanced layer media in the layered video encoding, a multi-view media coding, and other similar information. The MFUs are related to information on the scalable media coding or the multi-layered media coding. Media codec device additional information (Mi) 809 is information that is changed according to a device in an encoding process by using a corresponding media codec. This displays a list or extended information on corresponding information in consideration of a case where a profile and level information on a corresponding media codec is changed or a type of codec is changed.

Furthermore, the MMT E.3 layer 105 generates the M-Unit for adding control information, such as characteristic information and signaling information required for the decoding, on corresponding multimedia data to the encoded multimedia data transferred from the media codec A 101 and transferring the multimedia data to the MMT E.2 layer 107. An example of the control information included in the aforementioned M-Unit will be discussed with reference to FIG. 9.

Figure 9:
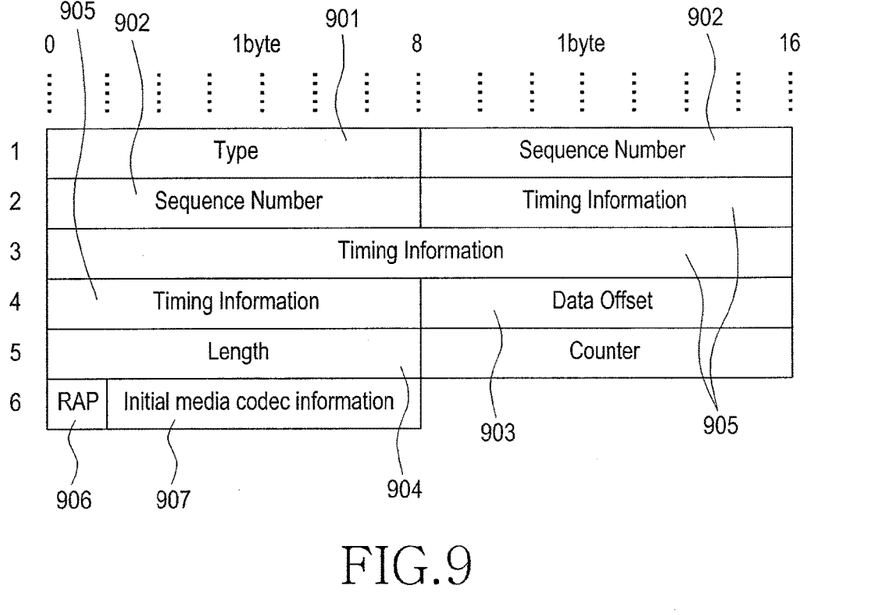
FIG. 9 is a diagram illustrating a construction of an M-Unit according to an exemplary embodiment of the present invention.

FIG. 9 is a diagram illustrating a construction of the M-Unit according to an exemplary embodiment of the present invention.

Referring to FIG. 9, an exemplary embodiment of the M-Unit, and information fields 901 to 908 are described below. However, the present invention is not limited thereto, and the M-Unit may be configured in a variety of suitable manners and types.

A type 901 is an M-Unit identifier indicating configuration information for the M-Unit. This represents flag information indicating whether the M-Unit includes a single MFU, fragmented MFUs, an MFU group, or a plurality of Access Units (AUs), as well as flag information additionally indicating whether the M-Unit is a start unit, a continued unit, or a last unit. A sequence number 902 indicates when the flag information is continued. The M-Unit has an increasing number that is information on an order of its use.

A data offset 903, which is given in bytes, is information that indicates a start position of M-Unit media data, and may be expressed in a length of header information for the M-Unit. Length information 904 indicates a length of M-Unit media data. Timing information 905 indicates a reproduction time of the M-Unit. The timing information 905 on the reproduction time includes decoding time information, expression time information, and other similar timing information, and an expression method may include a network synchronization time information expression method and a period included time information expression method.

Random Access Point (RAP) 906 indicates random access point information for a corresponding M-Unit. Video data using the RAP 906 may provide a random access reproduction function. In the case of providing the RAP 906, the M-unit includes at least one piece of RAP 906 information. Furthermore, when the M-unit includes at least one piece of RAP 906 information, the RAP provides multiple pieces of location information corresponding to the RAP. According to circumstances, a method of sequentially searching for a corresponding point by inserting a RAP recognition code of the MFU is provided.

Initial media codec information 907 indicates information on initial setting values of a media codec. An initial setting for the decoding in the media codec may be progressed through corresponding structure information.

Counter 908 may include information on allowance of multiple MFUs and a MFU/AU number. The multiple MFUs allowance information indicates whether M-Unit data includes a plurality of MFUs or one MFU, and indicates the number of MFUs when the M-Unit data includes a plurality of MFUs. The MFU/AU number indicates the number of internal data units when the M-Unit data includes a plurality of MFUs or AUs. Furthermore, the MFU/AU provides corresponding position information on data for an access of a corresponding MFU or AU. Additionally, corresponding position information may be found by adding an indicator for providing the corresponding position information to header information on the MFU or the AU and sequentially searching for the corresponding position information.

As described above, the MMT E.3 layer 105 (see FIG. 1) adds the control information to multimedia data, such as the MFU, acquired from a source, the MFU being transferred from the media codec A 101 and transfers the multimedia data to the MMT E.2 layer 107. Accordingly, the MMT E.2 layer 107 constructs the M-Unit by aggregating at least one multimedia data including the added control information.

The control information may be classified into control information about the MFU and control information about the M-Unit. Additionally, a particular information configuration of each of the control information about the MFU and the control information about the M-Unit may be configured in the manner described above, with respect to FIGS. 1, 6, 8 and 9. Additionally, the control information may be added to the header information in various forms. An exemplary embodiment of the configuration of the header of the M-Unit will be described below, with reference to FIG. 1.

The MMT E.2 layer 107 of FIG. 1 generates MMT asset data, hereinafter, referred to as an asset, by aggregating various types of MFUs provided from one or more multimedia data from multimedia sources and constructing the aggregated MFUs into the M-Unit. The MMT asset is constructed into hybrid media contents by receiving an input of a unit structure in accordance with attributes of various types of multimedia sources, i.e., multimedia data, such as a video data, audio data, text data, file data, widget data, application data, and other similar data. The asset includes one or more MMT M-Unit data, each one of which is an M-Unit, that is a group of the aforementioned NAL units such that the MMT M-Unit data are discriminated from each other. The MMT E.2 layer 107 generates the hybrid media contents in a form of the asset based on information necessary for transmission of the hybrid media contents or attribute information on multimedia data. Here, the "group" may be understood as a unit of encoded and/or decoded information in the multimedia system.

The M-Unit, which is a data group including information units having the same characteristic information, is generated by adding additional characteristic information required for the generation of the hybrid media contents to the NAL Unit data that is the output of the aforementioned encoder. An example of the additional characteristic information includes lossless information that is a characteristic of a file or widget data and loss allowance and delay information that is a characteristic of media data. The M-unit that is the group of the same characteristic units is configured and generated. The MMT E.1 layer 109 of FIG. 1 configures one or more assets transferred from the MMT E.2 layer 107 as an MMT package usable by a user.

Figure 2:
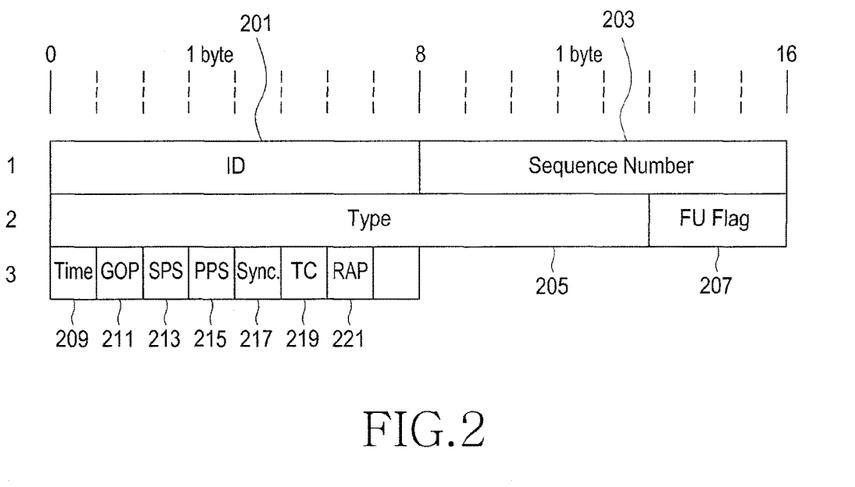
FIG. 2 is a diagram illustrating a construction of a header of a Media-Unit (M-Unit) according to an exemplary embodiment of the present invention.

FIG. 2 is a diagram illustrating a construction of a header of the M-Unit according to an exemplary embodiment of the present invention.

Referring to FIG. 2, fields included in the header of the M-Unit in FIG. 2 will be described below.

M-Unit IDentifier (ID) 201 is an identifier for determining a type of M-Units. Sequence number 203 indicates an order according to a function of the M-Unit. The sequence number 203 may be used for a function of an order re-arrangement according to a media reproduction time, such as a transmission loss retransmission request or media fast forward reproduction and a random access.

Type 205 indicates a type of data of the M-Unit. The type 205 may indicate characteristic information on a data group, and a file characteristic considering a loss rate, delay information for media reproduction, or other similar characteristics and information. Although it is not illustrated in FIG. 2, a payload onto which the data of the M-Unit is loaded is included at a backside of, or after, the header, so that multimedia data having various sources, such as a video, an audio, a text, a file, and a widget, may be transmitted. Accordingly, the type 205 may indicate a type of contents transmitted together with the header of the M-Unit.

The type 205 may include a three digit field indicating the type such that 000 indicates H.264 Video, 001 indicates AAC Audio, 002 indicates text, 003 indicates application, 004 indicates web pages, 005 indicates signaling for codec, 006 indicates signaling for composition, and 007 is reserved for future use. The type of appropriate contents may be indicated by using a predetermined value within a determined range by a provider of the hybrid media contents. Another example of the type 205 may be a case where 000 indicates a H.264 I frame, 001 indicates a H.264 B frame, and 002 indicates a H.264 P frame and may be used for a method of assigning a priority to various sources of specific multimedia. A Quality of Service (QoS) may be considered in transmitting multimedia data based on the priority.

A Fragment Unit (FU) flag 207 indicates information on continued M-Units. A value of the FU flag indicates whether a corresponding M-Unit is combined, is fragmented, or is a single M-Unit. A time flag 209 indicates that a corresponding M-Unit includes time information. A GoP 211 indicates that a corresponding M-unit includes information on its GoP unit. When the GoP 211 is included, a value of the GoP 211 indicates that the corresponding M-Unit has a single AU or multiple AUs. A MFU-range, although not illustrated in FIG. 2, indicates a value of a group of MFUs. A Spatial Parameter Set (SPS) 213 indicates that an M-Unit includes spatial parameter set information. The SPS 213 indicates information on a spatial position in which data of a corresponding M-Unit is displayed. A Presentation Parameter Set (PPS) 215 indicates that an M-Unit includes PPS information. The PPS 215 is information used for codec initialization and contains specific information on a media codec. Furthermore, the SPS 213 and the PPS 215 use a general value of an initialization parameter set of a media coding.

A sync 217 indicates that a corresponding M-Unit includes synchronization control information. The sync 217 is data for a mutual synchronization between combination processed multiple M-Units and, for example, is utilized as a synchronization marker between an M-Unit for a Right (R) image and an M-Unit for a Left (L) image for a 3-Dimensional (3D) image. Furthermore, sync 217 may be used to assign command information between corresponding M-Units. The command information is control information for the corresponding M-Units, and may indicate that a corresponding M-Unit corresponds to information such as addition, deletion, replacement, or update information. The Sync information may be used as control information for only the M-Unit in the same session transmitted through a hybrid transmission network based on the command information.

A Transport Characteristic (TC) 219 indicates that an M-Unit includes transport characteristic information. The TC 219 is for transmitting a corresponding M-Unit and indicates, for example, a loss rate, a delay time, parity information for an error recovery, an average bit rate for data transmission, and a maximum bit rate. A RAP 221 indicates that a corresponding M-unit includes flag information for a random access. A function construction, such as a fast forward reproduction, may be provided according to existence or non-existence of a corresponding flag.

FIG. 2 illustrates a construction of the header of the M-unit. However, the present invention is not limited thereto, and the construction of the header of the M-Unit according to the exemplary embodiment of FIG. 2 may be of other suitable forms and constructions. For example, the construction of the header of the M-Unit may include a combination of one or more information among the multiple header information included in the header of the M-Unit described with reference to FIG. 2 and/or the multiple control information added in generating the M-Unit in the description of the MMT E.3 layer 105 of FIG. 1.

Figure 3:
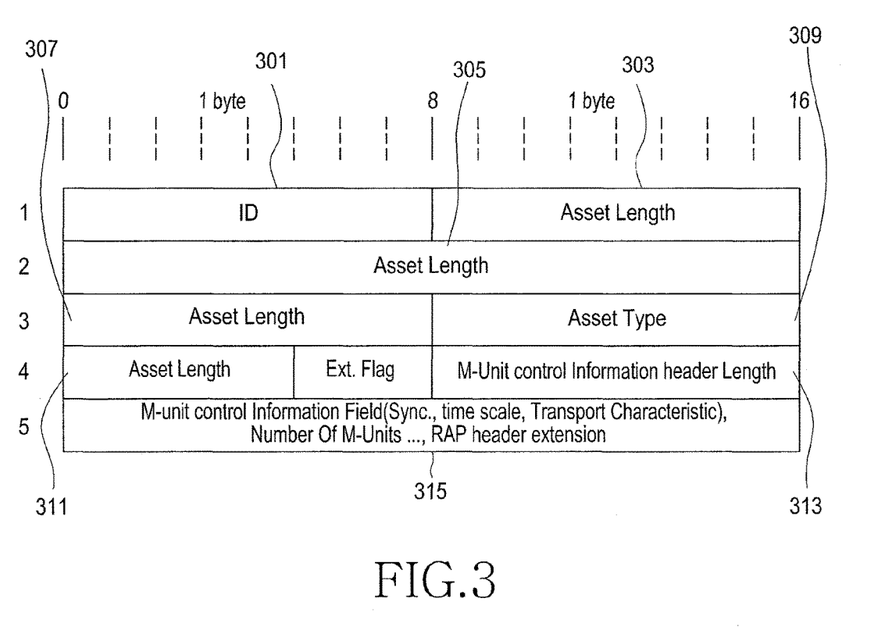
FIG. 3 is a diagram illustrating a construction of a header of an asset according to an exemplary embodiment of the present invention.

FIG. 3 is a diagram illustrating a construction of a header of the asset according to an exemplary embodiment of the present invention.

Referring to FIG. 3, the asset, according to the present exemplary embodiment, is generated in a structure including at least one M-Unit according to various multimedia data of media sources, and may be understood as a data stream including the various multimedia data of media sources. That is, each multimedia source is generated as the MFU or the M-Unit and the asset includes at least one M-Unit.

Table 1 illustrates an example of the M-Unit, the asset, and the FU.

TABLE 1

| Asset Header | M unit headers : | M unit header : | M unit header : | M unit header : |
|---|---|---|---|---|
| 1) Asset type: A | mfu rangue = 1-2 | mfu rangue = 3-4 | mfu rangue = 5-6 | mfu rangue = 5-6 |
| Asset Header | Asset Header | MPEG-2 TS data | MP4 data | |
| 2) Asset type: B (MPEG-2 TS) : | 3) Asset type: C (MP4) | | | |
| mfu header (1) : | mfu header (2) : | mfu header (3) : | mfu header (4) : | mfu header (5) : |
| off-set : | off-set : | off-set : | off-set : | off-set : |
| lengths | length | length | length | length |
| mfu data (1) | mfu data (2) | mfu data (3) | mfu data (4) | mfu data (5) |

In Table 1, off-set means the byte data offset information.

In further detail, FIG. 3 illustrates an example of header information on the asset used when the MMT E.2 layer 107 of FIG. 1 generates the asset with an input of the M-Unit that is grouped data of the same attribute information of various types of multimedia data. Furthermore, the header of the asset of FIG. 3 may indicate a unit group of spatially continued M-Units. An asset ID 301 indicates an identifier for corresponding continuous data. The asset ID 301 is identification information on corresponding assets in a process of generating the hybrid media contents.

Asset Length information 303, 305, 307, and 311 indicate a length of data of a corresponding asset. The asset length information 303, 305, 307, and 311 may be set to have a sufficiently long length considering Ultra Definition (UD) video data. Asset Length information 303, 305, 307, and 311 are separately indicated in three areas for convenience's sake. However, the present invention is not limited thereto, and the Asset Length information 303, 305, 307, and 311 may be one field or any suitable number of fields.

An asset type 309 indicates a data type of a corresponding asset, and may use the data type of the M-Unit aforementioned in FIG. 1 in the same manner as described with reference to FIG. 1. However, a multimedia type may be indicated in various methods, in addition to the aforementioned method. For example, a type of a first multimedia source may be directly notified to prevent inaccurate decoding of a multimedia source only with a name of a representative multimedia source due to recent various profiling and use of an audio codec, a video codec, or various applications. For example, there are approximately 10 types of profiling in H.264, so that when a type of asset is simply notified through H.264, an error may be generated in a decoding process. Furthermore, when multiple multimedia data is multiplexed and used in configuring the MMT package, a type of asset having a long length is used.

Additionally, for example, a type of asset having a length of 13 bits may conform to the data type of the M-Unit and it may indicate additional information according to a corresponding priority by adding an extension flag to the asset according to circumstances. For example, in the case of "00000000" based on H.264, an I frame in an image of H.264 may be indicated by "001", a B frame thereof may be indicated by "010", and a P frame thereof may be indicated by "100". A transmission priority for guaranteeing a maximum QoS at the transmission side for transmitting the M-Units may be considered based on the priority.

An M-Unit control information header length 313 indicates a length of an M-Unit control information header indicated in a corresponding payload, and notifies that there is M-Unit control information data equal to the length of the M-Unit control information header. M-Unit control information 315 includes at least one of synchronization information and asset command information, for commands to add, delete, insert, update, and replace, considering the hybrid transmission network, a time scale that is a basic time unit of a corresponding asset data group, transport characteristic information indicating a transmission rate, a loss rate, a delay allowance time, a maximum bit rate, an average bit rate, whether to guarantee a QoS, and other similar information, for the transmission data group, the number of M-Units included in a data group of a corresponding asset, and additional information on the RAP.

Although the header having a specific length, such as 1 bit or 2 bits, has been described as an example for describing a difference of the respective exemplary embodiments, a header of the M-Unit and/or asset having other lengths may be used. Furthermore, when the fields, as described above in the exemplary embodiments, are used without regard to a length, the configuration method of the M-Unit and/or asset may be done according to the exemplary embodiments of the present invention without regard to the length, as described in the exemplary embodiments.

The identifier or data type of the asset according to the exemplary embodiments of the present invention may indicate a type of multimedia data of a media source included in the M-Unit of the asset. For example, the identifier or data type of the asset may indicate whether the asset is for video data, audio data, or that the asset includes multiple multimedia sources, such as a video data, audio data, file data, widget data, or any other similar type of data. Furthermore, the identifier or data type of the M-Unit may indicate video data, audio data, file data, a widget having a type of data, i.e., a multimedia source, included in a corresponding M-Unit.

Figure 7:
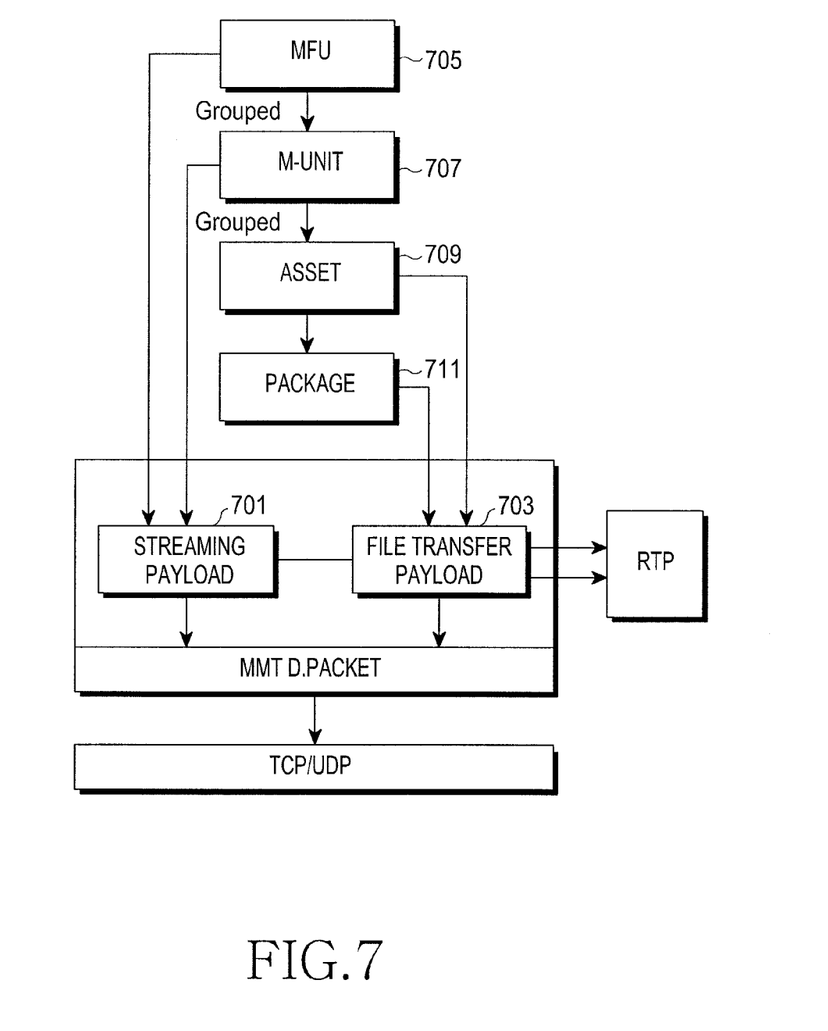
FIG. 7 is a block diagram illustrating a structure of a system for transmitting media contents by using various transmission units according to an exemplary embodiment of the present invention.

FIG. 7 is a block diagram illustrating a structure of a system for transmitting media contents by using various transmission units according to an exemplary embodiment of the present invention.

Referring to FIG. 7, a structure of the data stream may be classified into a structure of a streaming payload 701 for transmitting real time data closely related to a real-time broadcasting and a time and may also be classified into a file transfer payload 703 for transmitting non-real time data, such as a file transmission. Furthermore, in the streaming payload 701, media contents may be configured and transmitted using the MMT M-Unit or the MMT MFU as a basic transmission unit for real time data transmission.

An MFU 705 is a basic unit for processing multimedia data input from a codec or an application source. The MFU 705 may be one of an image or a plurality of blocks included in one image in a video codec, and may be one file block in a file, such as an application. Furthermore, the MFU 705 may be an MMT M-Unit 707 that is a basic unit of data transmission or application driving. For example, one M-Unit 707 may be constructed with a group of several AUs, which are the units for transmission of data configuring one image in video multimedia data. Through the configuration of the M-Unit 707, a user may perform a fast forward search or search through a video.

Furthermore, the M-Units 707 may be configured as one MMT asset 709. Further, the MMT asset 709 may be one of independent video data, audio data, or subtitles. A group of various types of MMT assets 709 may be an MMT package 711 capable of providing hybrid multimedia contents. Additionally, a data stream for file transmission is used for transmitting non-real time data, and a transmission unit may be an entire or a specific part of the MMT asset 709 or the MMT package 711 of the hybrid media contents.

As described above, a unit for encoding the media contents in the structure for transmitting the media contents according to the exemplary embodiment of FIG. 7 may be the MFU 705 or the M-Unit 707. In a case of an independently decodable video, the MFU 705 refers to one frame for the encoding or one of a plurality of slices when the frame includes the plurality of slices. Furthermore, in a case of an independently decodable video, the M-Unit 707 refers to one frame for the encoding or a GoP that is an independently decodable unit for the encoding.

A transmission unit of media contents may be determined considering an attribute and a service of the media. The asset 709 is a stream of the continuous M-Units 707 configured in the same media type. The package 711 is a form of a single asset or a group of multiple assets and may include additional information, i.e., image configuration information time of hybrid media, transmission environment information considering a spatial arrangement order and a hybrid network environment, a demanded transmission bandwidth, a loss probability, information on whether to allow a delay time, or any other suitable or similar information for a service.

Figure 4:
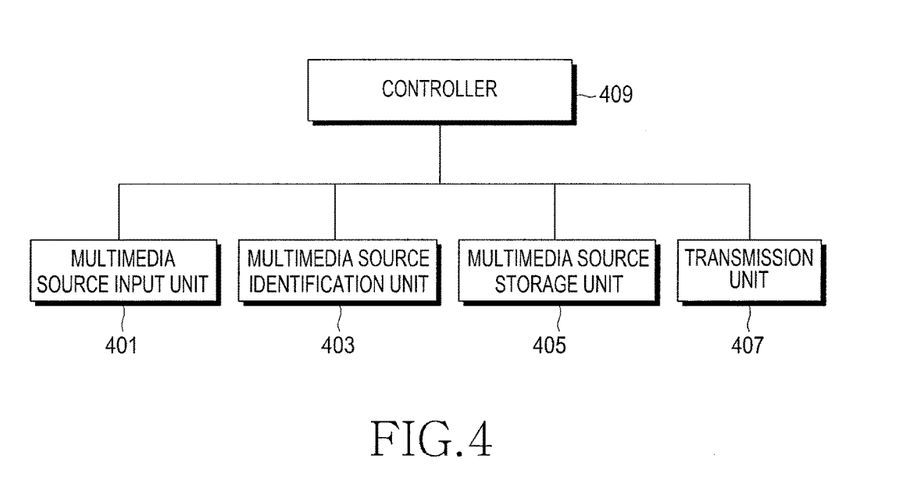
FIG. 4 is a block diagram illustrating a construction of a transmission apparatus for generating and transmitting media contents according to an exemplary embodiment of the present invention.

FIG. 4 is a block diagram illustrating a construction of a transmission apparatus for generating and transmitting media contents according to an exemplary embodiment of the present invention.

Referring to FIG. 4, the transmission apparatus includes a multimedia source input unit 401, a multimedia source identification unit 403, a multimedia source storage unit 405, a transmission unit 407, and a controller 409. The transmission apparatus of FIG. 4 supports various transmission units described with reference to FIG. 7, determines a transmission unit according to the structure for streaming for transmitting real time data and the structure for file transmission for transmitting non-real time data, and configures one or more multimedia sources into the MFU, the M-Unit, the asset, or the package as the transmission unit according to the determined transmission unit and transmits them as such. The multimedia source input unit 401 receives an input of the M-Unit that is a group of the various types of multimedia data as a multimedia source for generating the hybrid media contents. The multimedia source identification unit 403 assigns an asset ID to the group of the M-Units as the multimedia source, identifies a type, e.g., a voice source, a video source, a file, or an execution file, of the multimedia source, and assigns a corresponding asset ID to the group of the M-Units. Here, one asset may include multiple M-Units including the various multimedia sources. The multimedia source storage unit 405 stores the generated assets according to the configuration method of the asset. The transmission unit 407 transmits the asset or assets through a communication network. The controller 409 configures the M-unit by aggregating various types of MFUs provided from one or more multimedia data of multimedia sources and performs a general control for generating and transmitting the MFU, the M-unit, and the asset.

Figure 5:
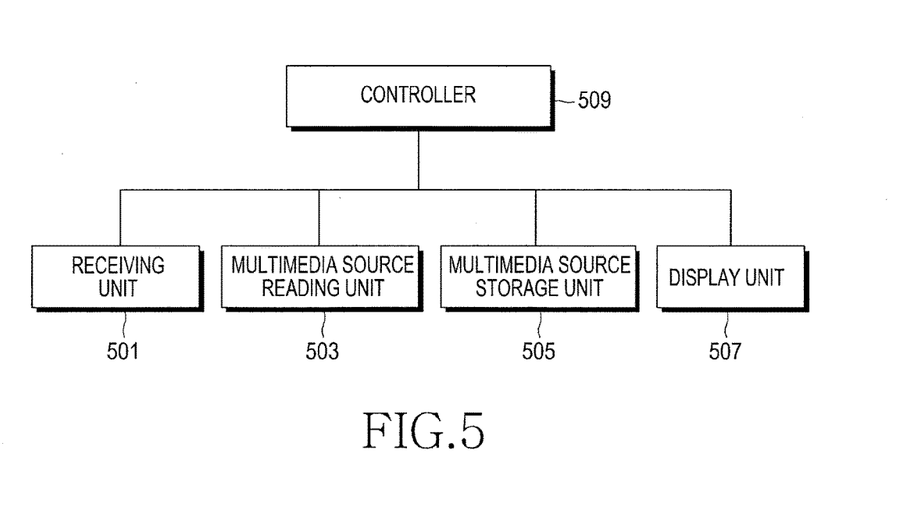
FIG. 5 is a block diagram illustrating a construction of a reception apparatus for receiving media contents according to an exemplary embodiment of the present invention.

FIG. 5 is a block diagram illustrating a construction of a reception apparatus for receiving media contents according to an exemplary embodiment of the present invention.

Referring to FIG. 5, the reception apparatus includes a receiving unit 501, a multimedia source reading unit 503, a multimedia source storage unit 505, a display unit 507, and a controller 509. The reception apparatus of FIG. 5 supports the various transmission units described with reference to FIG. 7, determines a transmission unit of media contents received by the corresponding transmission units according to the structure for the streaming for transmitting the real time data and the structure for file transmission for transmitting the non-real time data, identifies header information on the transmission unit, and performs the decoding of such. The receiving unit 501 of FIG. 5 receives the asset including one or more M-Units, including one or more MFUs, according to various multimedia data of multimedia sources through a communication network, and the header information on the asset and the header information on the M-Unit is transferred to the controller 509 to be used for the reception control and the decoding of the hybrid media contents. Furthermore, the controller 509 performs a general control related to the reception and the decoding of the hybrid media contents by using the control information about the MFU and the control information about the M-Unit.

The multimedia source reading unit 503 reads a data type of each multimedia source in the unit of the M-Unit based on the control information, including the control information about the MFU, transferred from the controller 509 receiving the respective information about the asset and the M-Unit, and classifies and stores the respective read multimedia sources in the source storage unit 505. The controller 509 of FIG. 5 performs a general control for the reception of the asset and the reading and the decoding of the multimedia source, and data of the decoded multimedia source is output through the display unit 507.

Accordingly, the present exemplary embodiments described above may provide the apparatus and the method for transmitting and/or receiving media contents by using various transmission units, such as the MFU, the M-Unit, the asset, or the package. Furthermore, the present exemplary embodiments may provide the apparatus and the method for efficiently generating and transmitting and/or receiving the hybrid media contents including various types of multimedia sources, i.e., multimedia data. Furthermore, the present exemplary embodiments may appropriately fragment multimedia data having a predetermined size in transmitting or storing the multimedia data.

Furthermore, the present exemplary embodiments may easily identify a position or a transmission time point of the M-Unit that is the decoding unit including at least one among a time, an importance degree, and various function information, as the control information, in the multimedia system and may efficiently notify a format of the asset, which is one format of the hybrid media contents, using an appropriate manner. Furthermore, the present exemplary embodiments may efficiently notify the type of asset in the multimedia system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for transmitting a media packet in a multimedia system, the apparatus comprising:
   a transmitter configured to transmit data; and
   a processor coupled with the transmitter and configured to:
      identify a unit which includes at least a part of media data, the unit comprising at least one media fragment unit (MFU) which is a fragment of the unit, the unit being independently decodable in decoding processing, and
      transmit the media packet including data of the unit in a payload of the media packet,
   wherein the MFU includes a count value indicating a number of at least one subsequent MFU which is dependently decodable based on the MFU in the decoding processing, the at least one subsequent MFU being correlated with the MFU in the decoding processing,
   wherein the MFU includes number information indicating an order of the MFU,
   wherein the MFU includes information indicating a priority of the MFU relative to another MFU within the unit, and
   wherein the payload includes an indicator indicating one of:
      the payload includes one or more complete MFUs,
      the payload includes a first fragment of the MFU,
      the payload includes a last fragment of the MFU, or
      the payload includes a fragment of the MFU that is neither the first fragment nor the last fragment.

2. The apparatus of claim 1, wherein the count value indicating the number of the at least one subsequent MFU is included in a header of the MFU.

3. The apparatus of claim 1, wherein the media data comprises timed data.

4. The apparatus of claim 1, wherein the at least one subsequent MFU is not processed without the MFU.

5. The apparatus of claim 1, wherein the count value of the MFU does not indicate a decoding order of the MFU.

* * * * *